United States Patent [19]
Cina et al.

[11] Patent Number: 5,537,504
[45] Date of Patent: Jul. 16, 1996

[54] MOLDED PLASTIC OPTICAL FIBER-OPTOELECTRONIC CONVERTER SUBASSEMBLY

[75] Inventors: Michael F. Cina, Hopewell Junction; Mitchell S. Cohen, Millwood; Glen W. Johnson, Yorktown Heights; Modest M. Oprysko, Mahopac; Jeannine M. Trewhella, Peekskill, all of N.Y.

[73] Assignee: International Business Machines Corporation, Armonk, N.Y.

[21] Appl. No.: 551,072

[22] Filed: Oct. 31, 1995

Related U.S. Application Data

[62] Division of Ser. No. 322,849, Oct. 13, 1994, Pat. No. 5,511,140.

[51] Int. Cl.⁶ ............................... G02B 6/00; G02B 6/36
[52] U.S. Cl. ............................................................. 385/93
[58] Field of Search .......................... 385/88, 89, 90, 385/91, 92, 93, 33; 219/121.69

[56] References Cited

U.S. PATENT DOCUMENTS

| | | | |
|---|---|---|---|
| 4,060,309 | 11/1977 | LeNoane et al. | 385/88 |
| 4,385,800 | 5/1983 | Basola et al. | 385/88 |
| 4,616,899 | 10/1986 | Schlafer | 385/88 |
| 4,786,135 | 11/1988 | Boero | 385/93 X |
| 4,875,215 | 10/1989 | Hughes | 372/6 |
| 5,011,247 | 4/1991 | Boudreau et al. | 388/88 |
| 5,011,254 | 4/1991 | Edwards et al. | 385/33 |
| 5,029,965 | 7/1991 | Tan | 385/88 |
| 5,040,886 | 8/1991 | Gunter | 359/362 |
| 5,073,047 | 12/1991 | Suzuki et al. | 385/93 |
| 5,093,878 | 3/1992 | Haley et al. | 385/92 |
| 5,181,265 | 1/1993 | Nishiwaka et al. | 385/93 X |
| 5,247,595 | 9/1993 | Foldi | 385/93 X |
| 5,256,851 | 10/1993 | Presby | 219/121.69 |
| 5,265,177 | 11/1993 | Cho et al. | 385/14 |
| 5,278,929 | 1/1994 | Tanisawa et al. | 385/93 |
| 5,333,224 | 7/1994 | Kikuchi | 385/93 |
| 5,351,330 | 9/1994 | Jongewaard | 385/93 |
| 5,353,294 | 10/1994 | Shigeno | 385/93 X |
| 5,396,571 | 3/1995 | Saadatmanesh et al. | 385/33 X |
| 5,402,510 | 3/1995 | Kalonji et al. | 385/93 X |
| 5,416,869 | 5/1995 | Yoshino | 385/93 X |
| 5,436,990 | 7/1995 | Head et al. | 385/93 X |

FOREIGN PATENT DOCUMENTS

| | | |
|---|---|---|
| 56-46203 | 4/1981 | Japan . |
| 60-64313 | 4/1985 | Japan . |
| 62-81614 | 4/1987 | Japan . |
| 4114117 | 4/1992 | Japan . |

OTHER PUBLICATIONS

Kuniharu Kato and Isao Nishi, "Low–Loss Laser Diode Module Using a Molded Aspheric Glass Lens", IEEE Photonics Tech. Lett., vol. 2, No. 7, Jul. 1990, pp. 473–474.

B. H. Johnson, J. G. Ackenhusen and O. G. Lorimar, "Connectorized Optical Link Package Incorporating a Microlens", Bell Laboratories, Murray Hill, New Jersey 07974.

R. G. Nolan and M. R. Palmer, "Plastic Optical Sub–Assembly", IBM Technical Discl. Bulletin, vol. 34, No. 7B, Dec. 1991, p. 230.

Primary Examiner—Akm E. Ullah
Attorney, Agent, or Firm—Daniel P. Morris; Alvin J. Riddles

[57] ABSTRACT

An optical subassembly for transferring light between an optoelectronic converter and an optical fiber where the housing and the lens are of plastic in which the housing is made to dimensions within the precision of molded plastic and the lens imparts focusing properties that compensate for the limitations of the plastic technology. Alignment in the X-Y plane only is employed. The lens has a first surface focused on the optoelectronic converter which substantially collimates the light through the lens and a second surface that introduces deliberate longitudinal spherical aberration that compensates for component position. Attachment or fixing of the optoelectronic converter to the housing is accomplished by RF heating a TO can to quickly cure an epoxy layer.

17 Claims, 4 Drawing Sheets

MOLDED PLASTIC OPTICAL FIBER-OPTOELECTRONIC CONVERTER SUBASSEMBLY

This application is a division of application Ser. No. 08/322,849, now U.S. Pat. No. 5,511,140 filed Oct. 13, 1994.

FIELD OF THE INVENTION

The invention is in the field of subassemblies that transfer light between an optical fiber and an optoelectronic converter and in particular to the technology of the construction of optical subassemblies of molded plastic material.

BACKGROUND AND RELATION TO THE PRIOR ART

The efficiency of an optical fiber as a signal transmission conduit is considerably affected by the precision in transferring the light between the optical fiber and an optoelectronic converter such as a photodetector or laser that converts the light signals to electrical signals or electrical signals to light signals respectively. There is generally a considerable mismatch between the light radiation or reception patterns of optical fibers and the light radiation or reception patterns of optoelectronic converters. The alignment tolerances are very small thereby requiring housings that can maintain precision alignment in service.

The simplest optical subassembly arrangement is to butt the face of the optical fiber to the optoelectronic converter. In this type of arrangement the light transfer efficiency is so low as to seriously restrict the uses.

The use of small lenses of various types has been employed in the art to help in accommodating the light radiation or reception mismatch.

An illustration of the state of the art of the use of small lenses in optoelectronic conversion subassemblies is provided in "Microlenses to improve LED-to-fiber optical coupling and alignment tolerance" by J. G. Ackenhausen in Applied Optics Vol. 18 No. 21 November 1979.

As the art is progressing, many optoelectronic conversion subassemblies are becoming arrangements wherein a housing supplies rigid alignment among the optical fiber, the lens and the optoelectronic converter. An illustration of this type of optical subassembly is described in "Low-Loss Laser Diode Module Using a Molded Aspheric Glass Lens" by Kato et al in IEEE Photonics Technology Letters Vol. 2 No. 7 July 1990 pages 473–474.

Optical subassembly constructions of this type however have the limitations of requiring carefully selected materials for the housings and the lenses for both optical performance and mechanical stability in addition to being able to withstand high temperatures while the parts are permanently attached or fixed in position during the alignment steps of the assembly process. High precision machining of the housings and lenses to establish axially aligned locations is required. Once constructed, intricate alignment operations in three dimensions are necessary to achieve good power transfer.

The use of molded plastic in optical subassemblies has been an attractive goal in order to reduce machining cost. One illustration is in IBM Technical Disclosure Bulletin, Vol. 34, No. 7B, December 1991, Page 230 wherein there is described a tapered bore in a plastic housing that is designed to hold an optical fiber end in fixed relationship to an hermetically sealed optoelectronic converter that has a lensed can.

In U.S. Pat. No. 4,616,899 an optoelectronic subassembly is arranged with a moldable plastic housing wherein portions of the housing material serve as lenses. The structure requires a complex alignment procedure.

An illustration of the complexity of alignment along all three X, Y and Z axes as practiced in the art is shown in U.S. Pat. No. 5, 029,965.

There is a need in the art for the ability to produce optical subassemblies with reduced machining, greater flexibility in material selection and simpler alignment to achieve an inexpensive but nonetheless functional and durable assembly.

SUMMARY OF THE INVENTION

The invention arranges the interface between an optical fiber and an optoelectronic converter so that a subassembly connector with that interface can employ plastic construction. In the structure only three parts are involved, an optoelectronic converter, a lens and a housing. In the coming discussion the axis lying along the center of the fiber and the center of the lens is referred to as the Z axis. Alignment is accomplished by moving the optoelectronic device in a plane perpendicular to the Z axis. The housing is of molded plastic with a bore to accommodate the ferrule of a fiber optic cable with a precisely located fiber optic ferrule stopping shoulder. There is a Z axis centered molded plastic asymmetric lens, aligned in a second Z axis centered bore in the housing. In a preferred embodiment, the surface of the lens nearer the optical fiber provides deliberate spherical aberration to produce a focus range that permits eliminating Z axis alignment. The surface of the lens that is nearer to the optoelectronic converter acts on the light emanating from or is focused on a supported optoelectronic converter whose position, in turn, is centered on the Z axis within a third housing bore that establishes position on the Z axis but has tolerance in the X and Y directions for X and Y alignment and subsequent attachment by application of heat to partially cure an epoxy. While other means can be used for applying the heat needed to partially cure the epoxy, a preferred means is to heat inductively the support of the optoelectronic converter which is made of a material capable of absorbing power from a locally applied radio frequency field.

The structure of the invention permits the use of molded plastic for the housing and lens and the use of epoxy resin adhesive for the attachment. Attachment temperature is minimized and the need for Z axis alignment is eliminated. The optoelectronic converter subassembly of the invention is illustrated for a multimode 50 micrometer diameter core optical fiber and a 780 nanometer wavelength laser optoelectronic converter hermetically sealed in a TO can, and with a corresponding optoelectronic detector. The housing is of particulate-filled injection molded poly(aryletherketone) or poly(benzoatenaptholate); fillings such as carbon or glass may be used. The lens is of injection molded plastic material that is dimensionally stable such as optical grade polycarbonate or polyolefin. With this arrangement only one critical alignment and attachment step is required, that is the alignment and fixing of the optoelectronic converter in the housing.

DESCRIPTION OF THE INVENTION

In the transferring of optical signals between an optical fiber and an optoelectronic converter, highly precise optical subassemblies(OSAs) are employed to hold the end of the optical fiber in alignment with the optoelectronic converter in such a way that an acceptable power transfer takes place. The optoelectronic converter is a semiconductor device. The optoelectronic converter converts between light and electrical signals and may be selected to favor a particular direction such as transmission by using a light power projecting laser and it may be selected to favor reception by using a sensitive light responsive diode. Such subassemblies are referred to in the art as transmitting optical subassemblies (TOSAs) and receiving optical subassemblies (ROSAs).

To meet the precision requirements and to retain them in service conditions, optical fiber-optoelectronic converter subassemblies are often made with over ten precisely machined parts of stainless steel and ceramic. Such structures give high transfer efficiency, with as high as 70% being reported. The alignment operations and the rigid fixing in place of the aligned structural parts are complex and require considerable care to minimize the transfer of damaging heat to the semiconductor optoelectronic converter. The fixing in place of the materials used in these structures usually is done by soldering or by high power laser welding.

A major problem encountered in all alignment and fixing operations, be it fixing by epoxy, solder or laser welding, is the shifting of the parts during fixing by the action of the applied heat causing the alignment to deteriorate and the coupling efficiency to be reduced.

In accordance with the invention the parts of the subassembly are so arranged that the epoxy type adhesive can be used to fix the housing to the TO can of the optoelectronic converter. The shrinkage during curing limitation of the use of epoxy is overcome by providing structural features where a thin layer of epoxy will suffice and an axial force during curing can be applied. There is, however, the necessity of producing a lens design which provides tolerances to Z axis variations in the location of the optoelectronic converter. Such Z axis variations are found for example in the placement of the laser chip on its support in the TO can for a TOSA. The lens in the invention provides the necessary wide Z axis tolerances.

This invention arranges the optical interfaces between the optical fiber and the optoelectronic converter to permit the use of injection molded plastic and to permit low heat transfer in fixing and retention of the aligned parts resulting in acceptable transfer efficiencies, greater than 25%, and with much simpler and more economical structures and alignment procedures.

Figure 1:
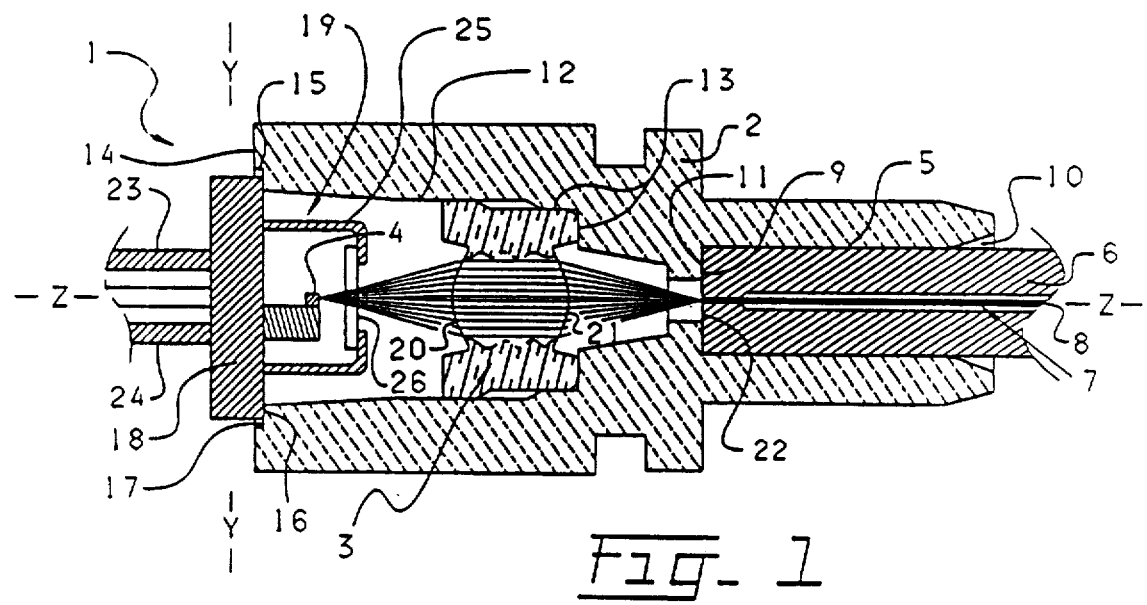
FIG. 1 is a cross-sectional view of the fiber optic plastic optoelectronic converter subassembly of the invention, showing a fiber mounted in a ferrule which in turn is inserted into the receiving bore of the optical subassembly housing.

Referring to FIG. 1 there is provided a cross-sectional view of the subassembly of the invention. In FIG. 1 the subassembly 1 is made up of a housing 2, a lens 3 and a supported optoelectronic converter 4. The housing 2 is of injection molded plastic having: a high modulus of elasticity for rigidity, a high temperature resistance to withstand the heat of the attachment in alignment, highly accurate moldability to tolerances, after a postmold bake cycle, of the order of 5 micrometers, and a high wear resistance to be able to withstand multiple optical fiber ferrule insertions and withdrawls. Materials such as poly(aryletherketone) and poly(benzoatenaptholate), highly filled with such materials as glass or carbon fibers are satisfactory. These materials are known as Vitrex 450CA30, commercially available from ICI, and Vectra 230, sold by Hoechst-Celanese. Generally materials with a high modulus of elasticity fulfill the requirements.

The housing 2 has several bores all centered on the Z axis with the dimensional positioning of the shoulders of the bores serving as locating stops.

In the housing 2 there is the optical fiber accommodating first bore 5 into which the ferrule 6 of an optical fiber 7 with a signal carrying core 8 is inserted. The ferrule 6 terminates at a face 9. The fiber is mounted in the ferrule so that the face of the fiber is in the face of the ferrule. The bore 5 has a tapered entrance 10 and a diameter dimension related to the outside diameter of the ferrule 6 so as to retain the optical fiber face 9 against the shoulder 11 in a friction fit. A second bore 12 with further alignment shoulder and bore 13 is made through the face 14 and provides a precise locating sliding fit for the lens 3 when the peripheral portion of the lens 3 is in the alignment bore and against the shoulder 13. A third bore 15 into the face 14 provides a shoulder 16 that positions the optoelectronic converter 4 along the Z axis. The diameter of the bore 15 is larger by a clearance 17 than the diameter of the support 18 of the optoelectronic converter 4 to allow for the movement required for the x–y alignment of the optoelectronic converter 4 and to permit only a thin layer of epoxy adhesive for use in attaching the aligned support 18 in position.

The element 3 is an asymmetric lens of molded plastic. The lens 3 is asymmetric in that the lens surfaces 20 and 21 have different optical properties. The lens 3 may have the surface 20 spherical or aspherical, and the surface 21 aspherical. Alternatively, lens 3 may have the surface 21 spherical or aspherical and the surface 20 aspherical.

The surface 20 near the optoelectronic converter 4 is focused on the photoresponsive location of the optoelectronic converter 4 and substantially collimates the light passing through the lens 3 to the opposite face 21. The distance, or center thickness on the Z axis between the faces 20 and 21 is very nearly the same from lens to lens when molded. The distances from the locating portions to the lens surfaces must be held to close tolerances. The combined effect of surfaces 20 and 21 is to deliberately remove the longitudinal spherical aberration introduced by window 26 and to introduce longitudinal spherical aberration that operates to soften the focus comparable to the alignment distance needed in Z axis alignment so that an acceptable transfer of power through the optical subassembly of the invention can be realized without Z axis alignment of the optoelectronic converter.

The support 18 of the optoelectronic converter 4 has RF susceptability so that attachment or fixing can be accomplished by gentle heating right at the intersection of the parts. This arrangement permits very rapid heating of the interfaces to be joined and any intervening epoxy layer. Alignment in the X–Y plane takes place with the optoelectronic converter 4 being powered through the various conductors such as 23 and 24. The amount of light transferred through the subassembly is monitored through the core 8 of the optical fiber by, in the case of a TOSA, a detector at the far end of the optical fiber and, in the case of a ROSA, by monitoring the intercepted power at the optoelectronic converter of the light delivered by the optical fiber. The support 18 is moved in the X–Y direction, X not being visible in this figure, within the clearance 17, with the surface on which the can 25 is mounted being against the shoulder 16. When the maximum power is transferred, RF produced heat coupled through the susceptor properties of the support 18, cures the small quantity of epoxy and fixes the optoelectronic converter 4 in position. The RF couples readily into the TO can 25 which with window 26 provides a hermetic package for the optoelectronic converter 4.

Figure 2:
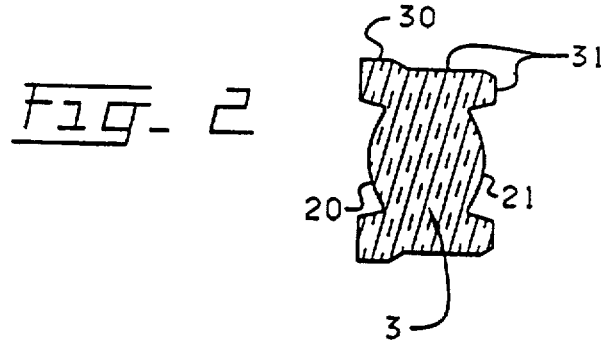
FIG. 2 is a cross-sectional view of the lens in the invention.

Referring to FIG. 2 there is provided a cross-sectional view of the lens 3 of FIG. 1 using where appropriate the same reference numerals as in FIG. 1. The lens 3 is of molded plastic with at least the lens face portions circularly symmetric around the Z axis line and with the peripheral surface portion 30 that bears on and is a sliding fit with no distortion into the bore 12 of FIG. 1 parallel with the Z axis. The peripheral surface portion has an alignment and stop portion 31 that serves, when in contact with the alignment bore and shoulder 13 of FIG. 1, to position the lens 3. The lens surfaces 20 and 21 perform different optical functions. In the preferred embodiment where the surfaces 20 and 21 are aspherical, the surface 20, that is to be near to the optoelectronic converter 4 of FIG. 1, focuses on the optoelectronic converter 4 and substantially collimates the light between the surfaces 20 and 21. The surface 21 has deliberately introduced longitudinal spherical aberration that produces a focus range adjacent to the face of the optical fiber 7. The lens 3 is retained, without distortion, in the bore 12 against the stop 13 by moving some material of the plastic housing 2 against the lens 3 in an operation known as staking. In the case where one of the surfaces 20 and 21 is spherical, the desired focus range is established by a properly designed combination of the spherical and aspherical surfaces.

Figure 3:
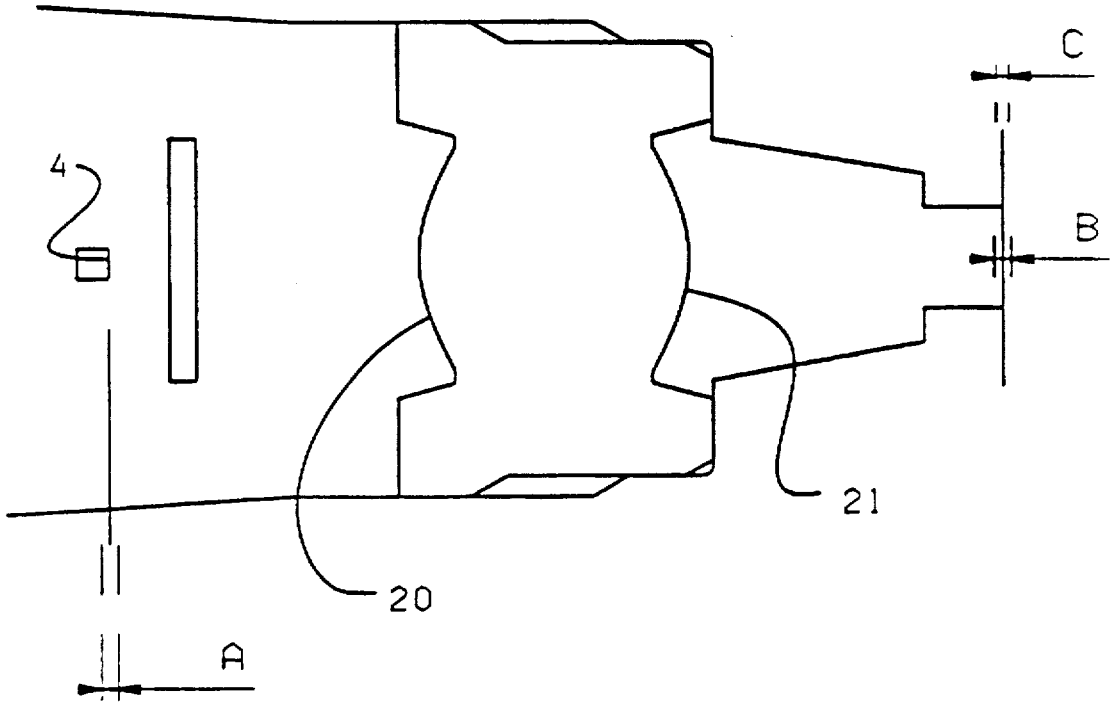
FIG. 3 is an illustration of the optical problem present in a plastic optical subassembly.

In FIGS. 3–7 the optical considerations and arrangement in the lens 3 selection and design are described, using the same reference numerals as in FIGS. 1 and 2 where appropriate. Referring to FIG. 3 a diagram is provided that is a depiction of the optical problem in the plastic optical subassembly 1 of the invention. In the problem there are three placement tolerances. The optoelectronic converter 4 has a placement tolerance, labelled "A" which is the variation in location of the optoelectronic converter 4 and the light responsive portion thereof inside the container 25, not shown in the figure. There is a tolerance labelled "B" which is the variation in location of the spot of focused light from the lens 3 along the Z axis. There is a tolerance labelled "C" which is the variation in position of the end of the ferrule.

The scale of the tolerance labelled "C" is exaggerated in the figure with respect to the tolerances "A" and "B".

In accordance with the invention light coupling between an optoelectronic converter and the end of an optical fiber is deliberately made more sensitive to placement variations in the X–Y plane perpendicular to the Z axis than to focus variations at the end of the optical fiber on the Z axis. In the optical system of the subassembly 1 of the invention, the location of the optoelectronic converter 4 is fixed along the Z axis with all alignment confined to the two dimensional X–Y plane and placement variation in the direction, although less sensitive than in the X–Y directions, is compensated for by softening the focus at the end of the optical fiber. An advantage of this arrangement is that alignment is greatly simplified when three dimensions are not involved.

Figure 7:
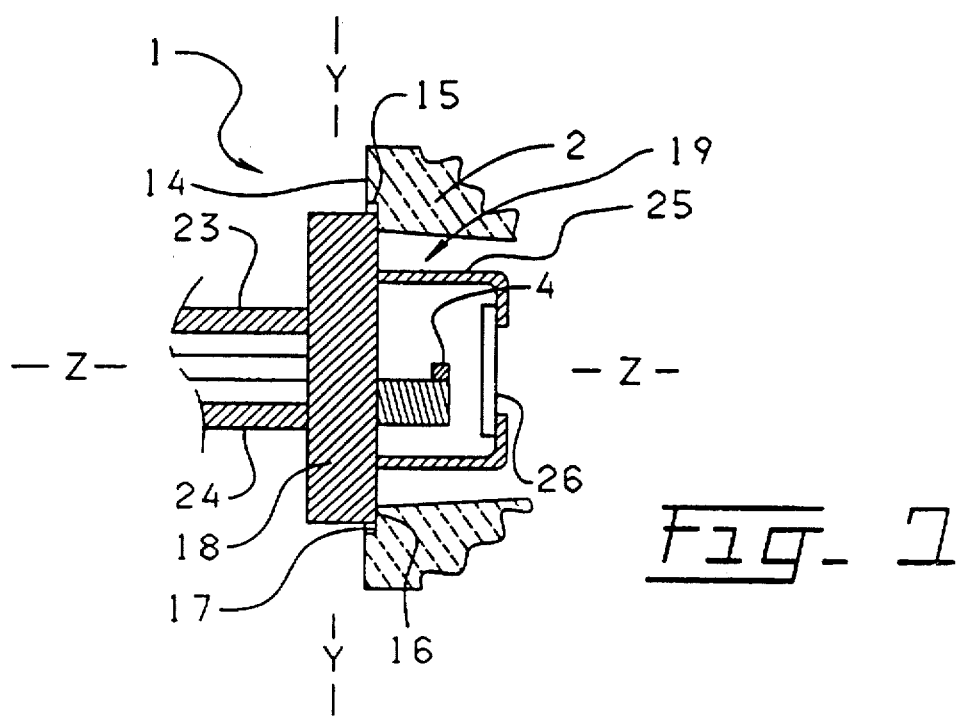
FIG. 7 is an illustration of the attachment considerations for optoelectronic converter alignment in the X–Y axis and epoxy adhesive attachment.

Referring to FIGS. 1, 2, 4 and 7 the interrelationship of the lens 3 of the invention to the optical coupling in the optical subassembly 1 of FIG. 1 is to be described. In FIG. 7 the position of the optoelectronic converter 4 is fixed along the Z axis by the support 18 therefor being in contact with the stop shoulder 169 of the housing 2. The optoelectronic converter package 19 however, may be moved in the X–Y plane within the clearance 17 of the bore 15 for fine tuning of light transfer. Under the conditions of the preferred embodiment the surface 20 of the lens 3 provides focus on the optoelectronic converter 4, substantially removes any spherical aberration introduced by the window 26 of the TO can 25 and substantially collimates the light between the faces 20 and 21. The lens 3 is asymmetric in that it uses different optical properties in the surface 21 than in the surface 20. The surface 21 is constructed to provide a soft focus in a dimension range along the Z axis. The soft focus is achieved by deliberately introducing longitudinal spherical aberration into the lens surface 21. The aberration curve labelled H is depicted in the section labelled I of FIG. 4. The curve is serpentine, rather than solely convex or concave, as in other types of lenses. In accordance with the invention the surface 21 of the lens 3 is designed and constructed so that example rays labelled K–R are focused in the expanded scale range labelled 27 along the Z axis. The dashed lines D illustrate a graphical means for using the curve H, representing on an expanded Z scale the longitudinal spherical aberration, to determine the intersection point along the optical axis Z of the ray K that traverses image space, after emerging from surface 21 of lens 3, with an intersection point W at plane V. The plane labelled S is the paraxial image plane and plane 9, shown on the expanded scale, is where the fiber face is placed. Thus, one surface 20 of the lens 3 provides focus to a fixed placement along the Z axis to one element, the optoelectronic converter 4 and the other surface 21 provides focus at the face 9 of the optical fiber in a range along the Z axis that accommodates for placement variation of the lens 3, the optoelectronic converter 4 and the optical fiber face 9. This can be viewed as giving a wide tolerance range for the placement of the optoelectronic converter within its optoelectronic package 19.

Figure 4:
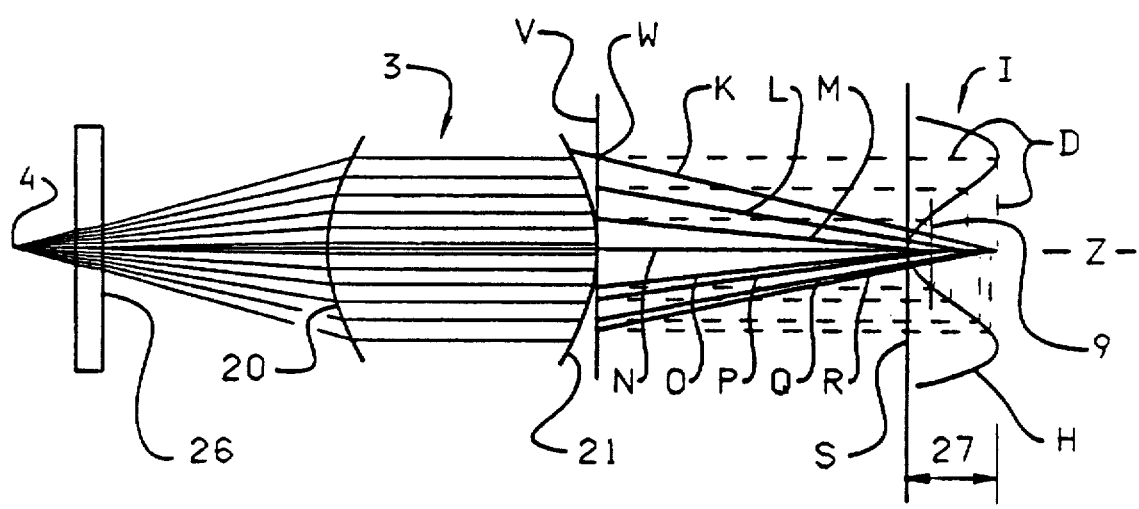
FIG. 4 is a depiction of the light rays between the optoelectronic converter and the optical fiber in the invention with a graphic illustration of the relationship between the ray position at a plane tangent to the lens surface nearer the optical fiber and its corresponding intersection, on an expanded scale, with the optical axis.
Figure 5:
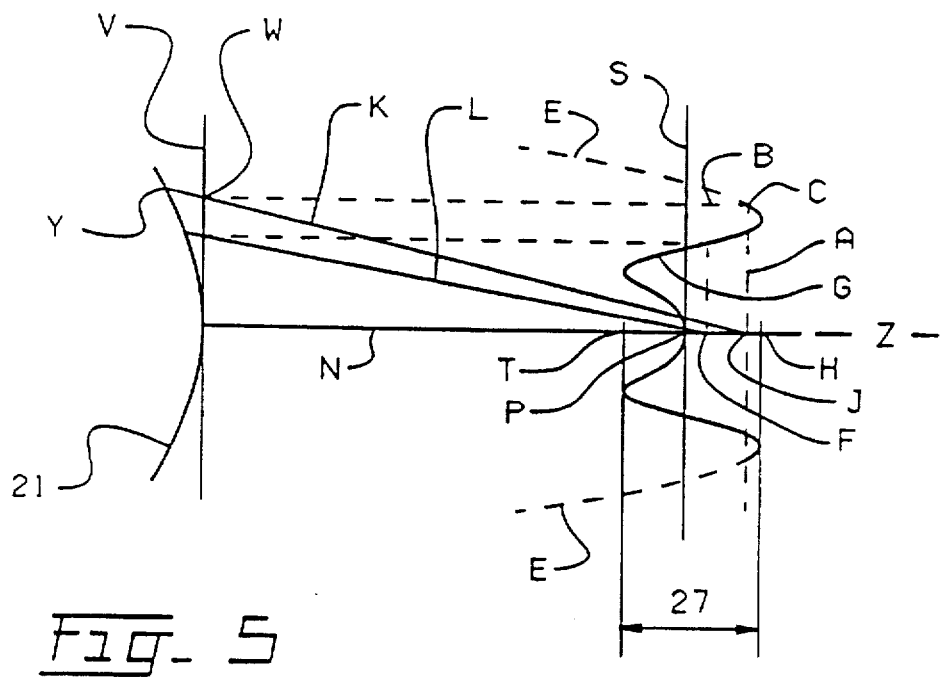
FIG. 5 is a depiction of the light rays entering image space and is a graphic illustration of an alternative instance of longitudinal spherical aberration.
Figure 6:
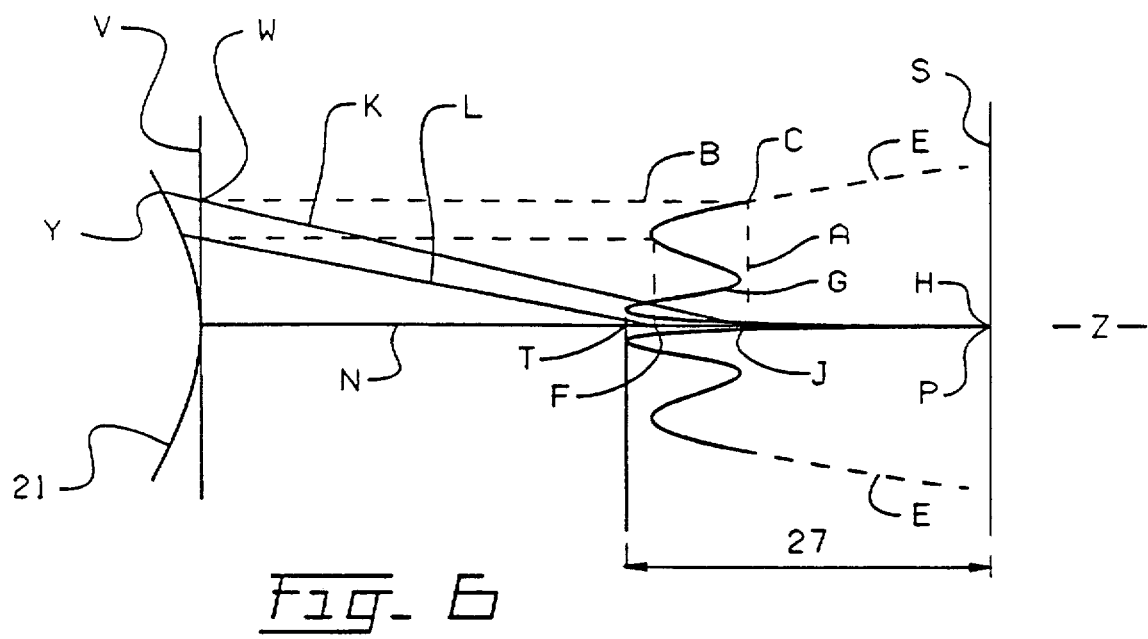
FIG. 6 is a depiction of the light rays entering image space and is a graphic illustration of another instance of longitudinal spherical aberration.

Referring to FIGS. 5 and 6, which use the same reference symbols as in FIGS. 1, 2 and 4, examples of two possible longitudinal spherical aberration curves are depicted. These two figures also illustrate the method by which the focus range 27 is determined. The longitudinal spherical aberration curve G plus its extended sections E are shown in an exaggerated fashion for clarity. Specifically the longitudinal spherical aberration curve is expanded in the Z direction only. In the two figures, a ray K leaving exit surface 21 at point Y passes through exit plane V at point W, point W being at the radial position of the ray K, exit plane V being a plane perpendicular to the optical axis N, and intersecting the optical axis N at the same point where surface 21 intersects the optical axis N. Ray K is shown as the ray that leaves the surface 21 at an angle, measured with respect to the Z axis, which is the largest possible angle that can be accepted by the optical fiber. The sine of this largest possible angle is also known in the literature as the NA or numerical aperture of the optical fiber. Both step index and gradient index optical fibers, known in the art, have well-defined maximum numerical apertures. Light that impinges upon the face of the optical fiber at an angle which exceeds this maximum possible angle, while it may propagate within the optical fiber for some distance, is usually disregarded because it can not be guaranteed that a significant portion of that incident light will propagate to the far end of the optical fiber. In the figures, ray K intercepts the optical axis N at point J and ray L, a typical example ray, intercepts the optical axis at point F. In practice, because of slight variations due to fabrication and alignment errors, rays travelling in three-dimensional space, but shown in the figures as projections onto a two-dimensional plane, may miss, by some slight amount, actually intercepting the optical axis N, whereas the two-dimensional representation of such rays travelling in three-dimensional space clearly indicate that the rays must have intersected the optical axis. The point J at which ray K intersects the optical axis N is determined by following dashed line B, line B constructed parallel to optical axis N, from point W to the corresponding point C on the longitudinal spherical aberration curve G, this curve describing the functional dependence that longitudinal spherical aberration has upon radial position in exit plane V. The intersection point J is that point along optical axis N corresponding to the point C on the curve and is found by following along line A, perpendicular to optical axis N, from point C to point J. Also shown is an example ray L, which is typical of all rays having angles of incidence on the face of the optical fiber greater than or equal to zero and less than or equal to the maximum acceptance angle, and dashed lines to illustrate the process of determining, as described above, its corresponding intersection point F.

Points along the extended sections E, the portion of the longitudinal spherical aberration curve G corresponding to angles of incidence on the optical fiber beyond the maximum acceptance angle, are not used when determining the range 27. All the points along curve G, starting with its intersection point P with the optical axis N and up to and including point C, are used when determining the range 27. Range 27, extending from point T to point H, represents the section of the optical axis N over which soft focus is achieved, and it is substantially within this range that the face 9 of the optical fiber is placed.

The design of the lens 3 is accomplished using conventional lens design techniques available in the art with the modification that rather than accurate imaging, the coupling efficiencies of the light transfer between the optoelectronic converter and the optical fiber is the measure of the lens' performance.

Lens design technology involves iterative computation in evaluating and optimizing the performance of a lens design. Computer programs are available in the art for the evolution of a lens design by iterative computations and the expression of that design by machine parameters, which can be machine translated into model formation specifications, the model formation specifications in turn being used to form the lens surface duplicating components of a mold, the mold then being used to fabricate multiple copies of the lens.

The modification to the general procedure in the art used in the design of the lens 3 is that in a first part of the design effort a numerical description of the light rays that must emerge in image space from a not yet designed lens, in order to meet the tolerance and coupling efficiency requirements of the optical subassembly, is produced and then in a second part, a numerical description of a lens, one that meets the needs established in the image space numerical description in the first part, is configured. In the first part, which may be described as the optimization of rays in image space, the goal is to develop a numerical description having adjustable parameters, generally a power series and specifically a power series having coefficients for second and fourth order terms, of the longitudinal spherical aberration as a function of the radial distance at which the rays enter image space. After establishing an initial set of numbers or parameters representing constraints and goals, such as the emission characteristics of a laser, the light accepting properties of fibers, the tolerance ranges and the desired range of the coupling efficiency, the optimization procedure is started. When completed, optimized values for the power series coefficients, the amount of defocus, and the magnification are determined. The optimized configuration coefficients are then used in the second part in connection with a standard lens design program such as ZEMAX-XE available in the art to configure the lens 3 with the designed configuration specification in turn being used to produce a mold from which many parts can be made.

Referring to FIG. 7 a cross-sectional view of the portion of the housing with the optoelectronic converter support member positioned in the bore for it is shown. The same reference numerals as in previous figures are used where appropriate. In FIG. 7 the bore 15 in the face 14 of the housing 2 permits the support 18 for the optoelectronic converter 19 to move in X and Y directions while being restrained linearly on the Z axis by the stop shoulder 16. The bore 15 is larger than the diameter of the support member 18 of the optoelectronic converter 19 by a clearance 17, of the order of 200 micrometers, which permits X or Y movement of the member 18 as much as 100 micrometers and also accommodates only a thin layer of epoxy resin adhesive that is to be used to attach the support member 18 to the housing 2 at the alignment point of maximum light transfer between the optoelectronic converter 4 and the optical fiber 7.

There are a number of considerations involved in the attachment. The semiconductor optoelectronic converter 4 is sensitive to heat and easily damaged in metal flow type of attachment. Epoxy resin is compatible with the plastic structure. The epoxy resin is cured in a short time with high temperature. The epoxy resin however shrinks on curing. In optical subassemblies only very small misalignment can be tolerated, for example about 7 micrometers for a multimode fiber. The advantages of epoxy can be gained only if the position of the optoelectronic converter is controlled after fixing and curing to keep the movement due to shrinkage within the tolerable amount.

In the structure of the invention a thin layer of epoxy is placed around the support 18. By inductively coupling radio frequency (RF) power into the optoelectronic converter package 19 primarily through its support 18, the rate at which the temperature of the optoelectronic converter package 19 rises and the time that it is held at an elevated temperature are precisely controlled. Since the support 18 is in intimate contact with the epoxy, the curing of the epoxy is accomplished under highly controlled conditions.

In alignment the optoelectronic converter 4 is powered through a plurality of conductors represented in FIG. 7 by conductors 23 and 24. The light from or to the optoelectronic converter 4 passes through the lens 3 and the corresponding signal is monitored. Through movement of the support 18 and optoelectronic converter assembly in the clearance 17, optimal coupling is achieved when the amount of light reaching the detector is maximized. In this arrangement the X and Y alignment is done in much shorter time since Z alignment is not involved. In prior art alignment where the Z dimension is involved each adjustment in the Z direction also affects the X and Y directions.

Figure 8:
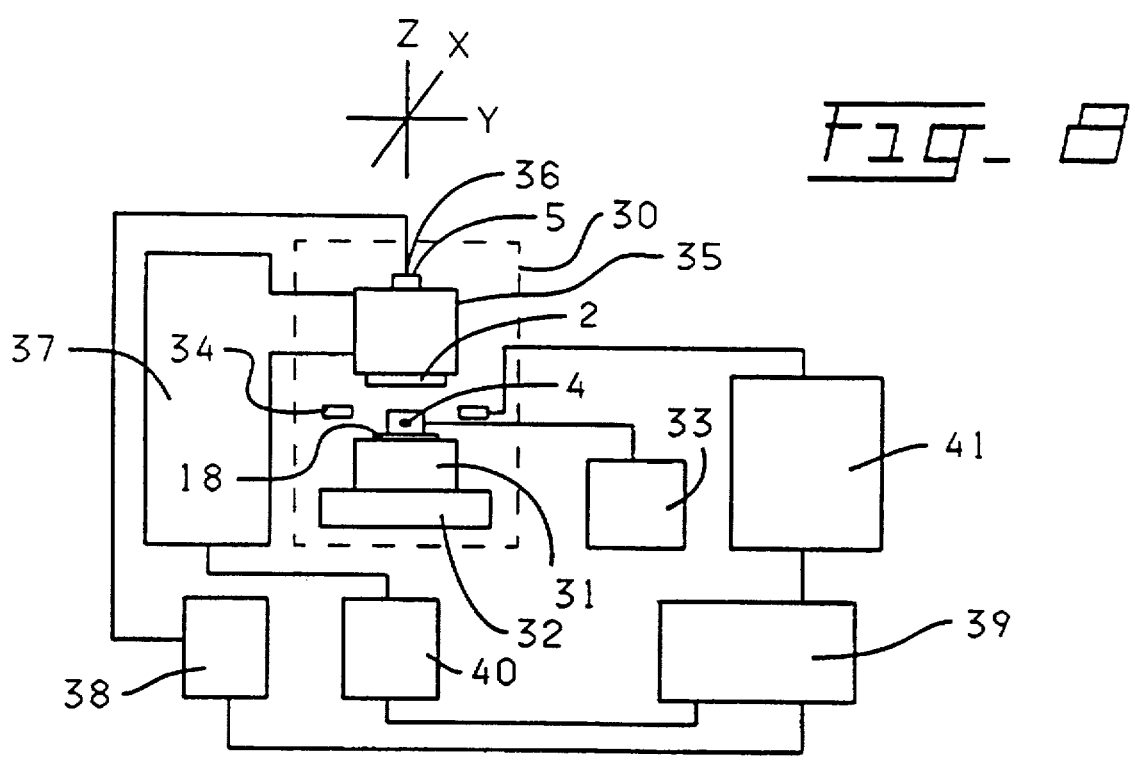
FIG. 8 is a functional block diagram of an apparatus for optoelectronic converter alignment in the X–Y plane and attachment of the optoelectronic converter.

Referring to FIG. 8 a block diagram of an alignment apparatus is provided wherein in a work station 30 shown dotted, a lower collet stage 31 on a workstation pedestal 32 grips the support member 18 of the optoelectronic converter package 19 and with the optoelectronic converter 4 being powered from a supply 33. An RF coil assembly 34 surrounds the optoelectronic converter package 19. This assembly includes a horse shoe shaped ferrite block which concentrates the RF field. An upper collet 3S shown separated in the Z direction for visibility, grips the housing 2 containing the lens 3 and having a fiber optic ferrule 36 plugged into the bore 5 of the housing 2. The upper collet 38 is controlled for movement in the X-Y-Z directions by a control stage labelled element 37. Alternatively the upper collet 35 can be controlled in the Z direction and the lower collet stage 31 can provide controlled motion in the X and Y directions. The optical power passing through the test optical fiber 36 is monitored by an optical power meter 38 for the case of a TOSA. In the case of a ROSA a semiconductor laser sends power through the test optical fiber and the detector optoelectronic converter produces the signal to be monitored.

A data processing controller 39 such as a personal computer with appropriate control software provides signals to the stage controller 40 and to a low power signal generator followed by an RF amplifier collectively shown as element 41. The amplitude and frequency of the signal generator are separately externally programmable through the data processing controller 39. Typically the RF signal is about 50 KHz and the maximum power delivered to the coil 34 is of the order of 100 watts, preferably between 10 and 1000 watts. The housing 2 is moved in the the Z direction until the support member 18 of FIG. 7 bearing a thin epoxy rim layer is in contact with the stop 16 in the bore 15. The control stage 37 then searches for a maximum optical power signal from the power meter 38 by movement in the X and Y directions within the clearance 17. At a maximum power indication the RF generated heat is applied to the epoxy in the bore 15 around the support 18 to cure the epoxy and permanently fix the optoelectronic converter in position with respect to the optical path in the housing 2 from the optoelectrical converter 4 through the lens 3 to the optical fiber 7. A force is applied along the Z axis by appropriate motion of the stages so that the collets 31 and 35 move toward each other to squeeze out excess epoxy and to supply friction to prevent shifting during curing of the epoxy.

The X and Y alignment involves a software search routine which iteratively searches the neighborhood of a given position to determine the displacement vector for increasing coupled power, then moves the stages to a new position, with decreasing coarseness of steps until maximum power is identified. The curing cycle provides a multi-stage RF signal with a high power, fast heat up and a low power dwell to provide epoxy cure times of the order of 20 seconds.

In order to provide a starting place for one skilled in the art in practicing the invention the following details of a preferred embodiment of the invention are provided.

Referring to FIG. 1 the unit is a Transmitting Optical Subassembly (TOSA). It will be apparent to one skilled in the art that similar specification selections are to be made for the Receiving Optical Subassembly (ROSA). The achieved coupling efficiency is about 30%. The optoelectronic converter 4 is a 780 nanometer wavelength laser hermetically sealed in a TO metal can 25 with a transparent window 26 supported by a metal disc 18. The optical fiber 7 is of the multimode type having an outside diameter of 125 micrometers and a core 8 diameter of 50 micrometers. The housing 2 is of polyetheretherketone having a carbon fiber filling. The heating for epoxy attachment is done with 50 KHz RF under a force of up to 25 lbs. normal to the interface of the support 18 and the shoulder 16. The epoxy is a fast cure commercially available type. The lens 3 is made of a transparent material such as optical grade polyolefin.

In the lens 3 design, two parameters defining two gaussian distributions for light intensity in the image space reference plane are established. The indexes of refraction of the core 8 of the fiber 7 and of the cladding are established as 1.4674 and 1.4531 respectively, resulting in a maximum acceptance numerical aperture of 0.2. Position tolerances, referred to image space, were established at ±100 micrometers in the Z axial direction and 16 micrometers in the radial direction, i.e. perpendicular to the Z axis. The minimum coupling efficiency is set at 0.25, and is held throughout the tolerance range. Fresnel losses at the optical surfaces are ignored during the design process. Magnification is a quantity that is allowed to vary in order to maximize coupling efficiency during the design process. The optimal value meeting the minimum coupling efficiency requirements was found to be about 1. Defocus is a parameter that is allowed to vary during optimization. Its optimal value was found to be 22 micrometers. Specifically the fiber face 9 is placed 22 micrometers from the nominal paraxial focus of lens 3 in a direction away from the lens surface 21.

After optimizing the coupling efficiency the coefficients describing the longitudinal spherical aberration serve as input to a conventional lens design program. The lens 3 surface 20 is optimized to produce substantially collimated light within the lens 3 and to accommodate any spherical aberration from the cover 26. The lens 3 surface 21 is then specified to provide the built in defocus 27 that compensates for position imprecision when using plastic material. The lens specifications are then used in a numerically controlled machine to form inserts with surfaces that become part of a mold.

What has been described is a low cost optical subassembly where the housing and the optical considerations compensate for inability to achieve and fix precise alignments when using molded plastic components.

What is claimed is:

1. An optical subassembly for signals carried between the face of an optical fiber and an optoelectronic converter, comprising:

a housing of plastic material adapted to position the face of said optical fiber, a lens and said optoelectronic converter, spatially separated along a common axis, and, to provide for limited distance moveability of said optoelectronic converter in a plane perpendicular to said common axis, a lens of plastic material positioned in said housing between said face of said optical fiber and said optoelectronic converter, said lens having a first surface adapted to focus light on said optoelectronic converter and to substantially collimate light through said lens, and, said lens having a second surface adapted to focus light in a range of distance along said common axis adjacent to said face of said optical fiber.

2. The optical subassembly of claim 1 including a heat responsive optoelectronic converter support member.

3. The optical subassembly of claim 1 where the material of said housing is taken from the group of particulate-filled poly(aryletherketone) and poly(benzoatenaptholate) materials.

4. The optical subassembly of claim 3 where said lens is of polycarbonate material.

5. The optical subassembly of claim 3 where said lens is of polyolefin material.

6. An optical subassembly for light signals carried between an optoelectronic converter and an optical fiber comprising:

a housing of plastic material,
said housing having first, second and third bores, each bore being centered around a common axis, and each bore having a stop shoulder at an element positioning location along said common axis,
said first bore having a diameter and tapered opening for an optical fiber element and a stop shoulder for positioning at a location on said common axis the signal transfer face of said optical fiber element,
said second bore having a lens alignment region and a lens positioning stop shoulder,
said third bore having a stop shoulder located for specific positioning along said common axis of a support member of said optoelectronic converter and having a clearance dimension perpendicular to said common axis to accommodate limited movement of said optoelectronic converter support member in a plane perpendicular to said common axis,
a lens of substantially transparent plastic material,
said lens being positioned in said second bore in contact with sad lens positioning stop shoulder,
said lens surface next to said optoelectronic converter providing light focus for said optoelectronic converter, substantial collimation of light through said lens and,
said lens surface next to said optical fiber providing focus of light over a well defined and precisely controlled range along said common axis adjacent said signal transfer face of said optical fiber.

7. The optical subassembly of claim 6 wherein said housing is of a plastic material taken from the group of particulate-filled poly(aryletherketone)s and poly(benzoatenaptholate)s.

8. The optical subassembly of claim 7 where said lens is of polycarbonate material.

9. The optical subassembly of claim 7 where said lens is of polyolefin material.

10. The optical subassembly of claim 6 where said optoelectronic converter is a laser.

11. The optical subassembly of claim 10 where the mounting for said optoelectronic converter is a metal packaging can.

12. An optical subassembly of the transmitting and receiving type for the transfer of signals between an optical fiber and an optoelectronic converter comprising:

a plastic material housing,
said housing being adapted for positioning the face of an optical fiber, a lens and an optoelectronic converter respectively spatially separated along a common axis, and with provision for limited movement of said optoelectronic converter in a plane perpendicular to said common axis,
said lens being of plastic material,
said lens having a first surface focused on said optoelectronic converter and adapted to substantially collimate light passing therethrough, and,
said lens having a second surface adapted to focus said collimated light in a range along said common axis at said face of said optical fiber.

13. The optical subassembly of claim 12 wherein:
said housing is of particulate-filled poly(aryletherketone) or poly(benzoatenaptholate) material, said lens is of polyolefin material, and, said optical fiber has a 125 micrometer diameter with a 50 micrometer core.

14. The optical subassembly of claim 13 wherein:
said optical fiber has a core index of refraction of 1.4674 and a cladding index of refraction of 1.4531, and said optoelectronic converter is a laser with a 780 nanometer wavelength.

15. The process of aligning an optical fiber and an optoelectronic converter, comprising the steps of providing a housing adapted to position the face of an optical fiber, a lens and an optoelectronic converter respectively spatially separated along a common axis with a first surface of said lens focused on said optoelectronic converter and with provision for limited movement of said optoelectronic converter in a plane perpendicular to said common axis, arranging the focus of a second surface of said lens to be in a range along said common axis at said face of said optical fiber, moving said optoelectronic converter in said plane perpendicular to said common axis to a location for maximum light power transfer at a detector, and, fixing the position of said optoelectronic converter at said location for maximum light power transfer.

16. The process of claim 15 wherein said detector detects light received by said optical fiber.

17. The process of claim 15 wherein said detector detects light received by said optoelectronic converter.

* * * * *